GEORGE LITTLE.
Improvement in Electrical Indicators.
No. 125,586.  Patented April 9, 1872.
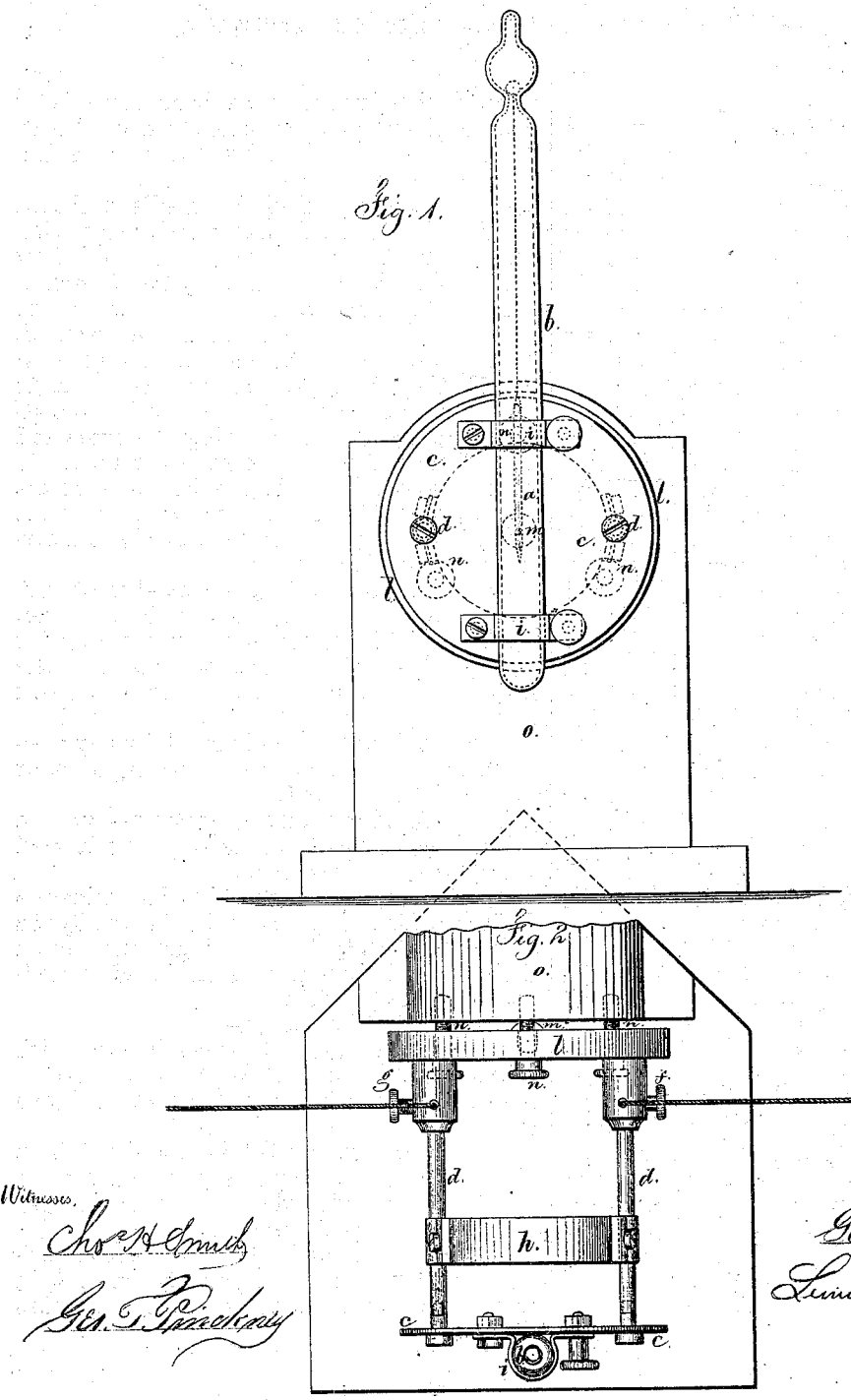

UNITED STATES PATENT OFFICE.

GEORGE LITTLE, OF RUTHERFORD PARK, NEW JERSEY.

IMPROVEMENT IN ELECTRICAL INDICATORS.

Specification forming part of Letters Patent No. 125,586, dated April 9, 1872.

*To all whom it may concern:*

Be it known that I, GEORGE LITTLE, of Rutherford Park, in the county of Bergen and State of New Jersey, have invented an Improvement in Electric-Indicators; and the following is declared to be a correct description thereof.

This invention is for indicating electric excitation in connection with telegraph-lines, instruments, or electrical appliances. In cases of telegraph-lines it is useful to denote the condition of the line or of the batteries, so that errors in insulation or defects in the battery may be apparent to observation without the use of any separately-manipulated instrument.

This invention consists in a needle, preferably of steel, suspended within a glass tube filled with alcohol or similar liquid, and contiguous to a helix that is movable so as to be adjusted nearer to or further from the said needle; and this helix is in the electric circuit; and when the current is weak said helix is moved nearer to the tube and needle, and when the current is stronger the helix may be moved further off. The helix, being influenced by the pulsations of the current, acts upon the needle, and, by its movement, indicates that the circuit is in working condition; or if the needle is not moved, or only slightly affected, the defective condition of the line is instantly shown.

In the drawing, Figure 1 is an elevation of the instrument, and Fig. 2 is a plan of the same.

The needle $a$ is suspended within the glass tube $b$, preferably by a silk thread, and the tube is filled, or nearly so, with alcohol and hermetically sealed. The needle is preferably magnetized with the south pole at the bottom. This tube is attached to a plate, $c$, that is at the ends of the slide-rods $d\ d$. To these rods $d\ d$ the wires of the circuit are connected by the binding-screws $f$ and $g$; and these slide-rods $d\ d$ are insulated, so that the current can only pass through the helix $h$ that is placed in a suitable case, and can be moved back and forth on the slides $d\ d$ and its distance from the needle $a$ adjusted, and, consequently, the electrical action upon the same. According to the force of the current or the distance the helix is from the needle, so the needle $a$ will be attracted toward the helix or vibrated by the electric pulsations.

It is important that the needle $a$ should hang at the right height in relation to the helix to obtain the maximum action. To allow of this the tube is sustained by the clamping-bands $i$, through which it may be moved to adjust the needle's position and then secured.

The tube $a$ should be vertical; and to allow of adjusting the apparatus the base $l$ is made with a central projection at $m$, with three attaching-screws, $n$, surrounding the same and passing into the block $o$ or other article to which the instrument is attached, so that the projection $m$ allows the base $l$ to be brought into a vertical plane and held firmly to a surface not perfectly vertical.

This instrument will be observed most easily when standing diagonally to the observer. I therefore attach the same on a triangular block, $o$, adapted to being fastened into the angle of a window-casing or other convenient position.

The needle will be influenced by any electric current, whether positive or negative, or its polarity alternated.

This instrument may be supported upon a ball-and-socket joint, so as to be positioned with facility and secured.

This indicator may be used to determine the distance of faults or defects in the line by the adjustment of the helix and graduations on the slides $d\ d$; or it may be employed in reading messages by sight.

I claim as my invention—

1. An indicating-needle, in combination with an adjustable helix that can be moved nearer to or further from the needle, substantially as set forth.

2. A needle suspended in liquid within a glass tube, in combination with the helix $h$ and slides $d$, upon which the helix is movable, as and for the purposes set forth.

3. The base $l$, made with the central projecting bearing $m$ and adjusting-screws $n$, in combination with the movable helix $h$, slides

*d*, and indicating-needle *a*, substantially as set forth.

4. A needle suspended by a thread in liquid within a glass tube and contiguous to a helix, for the purposes set forth.

5. The glass tube, made adjustable vertically and secured by the clamps *i*, and containing a suspended indicating-needle, in combination with a helix, substantially as set forth.

Signed by me this 19th day of February, A. D. 1872.

GEORGE LITTLE.

Witnesses:
GEO. T. PINCKNEY,
CHAS. H. SMITH.